United States Patent [19]

Eriksson

[11] 4,432,000
[45] Feb. 14, 1984

[54] REGISTERING APPARATUS

[75] Inventor: Harald Eriksson, Sollentuna, Sweden

[73] Assignee: Svenska Förpackningsforskningsinstitutet, Spanga, Sweden

[21] Appl. No.: 380,681

[22] PCT Filed: Aug. 26, 1981

[86] PCT No.: PCT/SE81/00239
§ 371 Date: Apr. 30, 1982
§ 102(e) Date: Apr. 30, 1982

[87] PCT Pub. No.: WO82/00894
PCT Pub. Date: Mar. 18, 1982

[30] Foreign Application Priority Data

Sep. 2, 1980 [SE] Sweden .................. 8006123

[51] Int. Cl.$^3$ ............... G01D 9/00; G01D 15/16; G01P 15/00
[52] U.S. Cl. ............... 346/7; 346/139 R; 73/514
[58] Field of Search ............... 346/7, 139 R; 73/514

[56] References Cited

U.S. PATENT DOCUMENTS

| | | | |
|---|---|---|---|
| 2,922,633 | 1/1960 | Gray | 73/514 X |
| 2,976,732 | 3/1961 | Hautly | 346/7 UX |
| 3,790,951 | 2/1974 | O'Neill et al. | 346/7 |
| 3,974,504 | 8/1976 | Engdahl | 346/7 |
| 4,027,535 | 6/1977 | Swanson | 73/514 X |

Primary Examiner—George H. Miller, Jr.
Attorney, Agent, or Firm—Burns, Doane, Swecker & Mathis

[57] ABSTRACT

An apparatus for registering accelerations and retardations includes a basic structure (1,2) on which an inertial mass is suspended in spring means and adapted to guide a writing means (C) coacting with a web (80) of registering medium, which is arranged for running substantially transverse the direction of movement of the writing means (C). The spring means includes two spring elements of which the first is adapted to bias the mass towards a normal position (60) with a force attaining a fraction of the force the mass maximally exercises on the first spring element under the action of gravity, while the second spring element is adapted for starting to exercise an elastic deformation resistance to the displacement of the mass when the latter is moved past a displacement position (61;62) substantially situated at a distance from the normal position (60) corresponding to the length by which the mass maximally deforms the biassed first spring element under the action of gravity minus a length corresponding to the deformation of the first spring element, occurring at a loading thereof with a force of the same order of magnitude as said biassing force.

10 Claims, 12 Drawing Figures

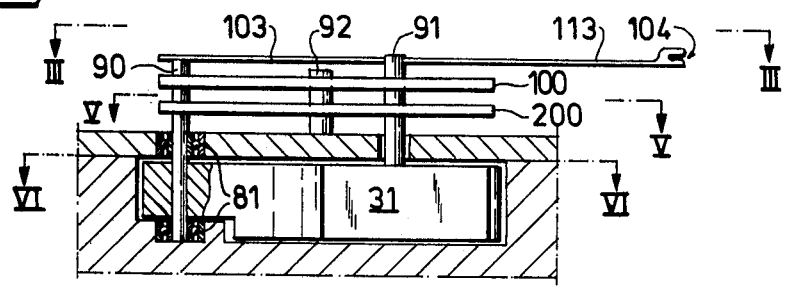
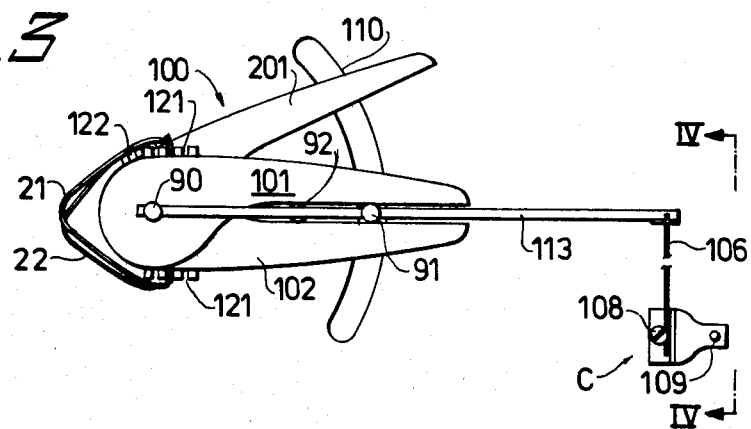
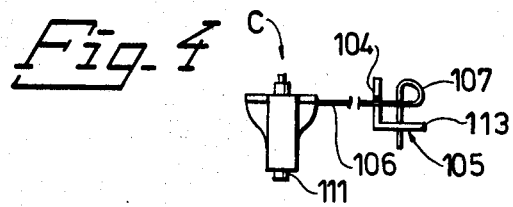
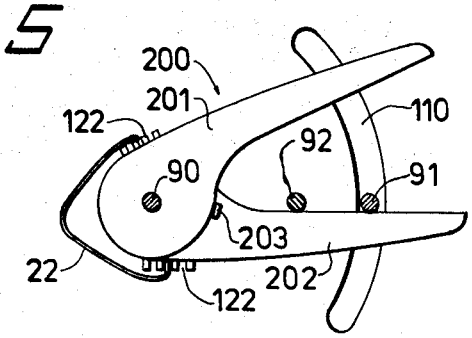

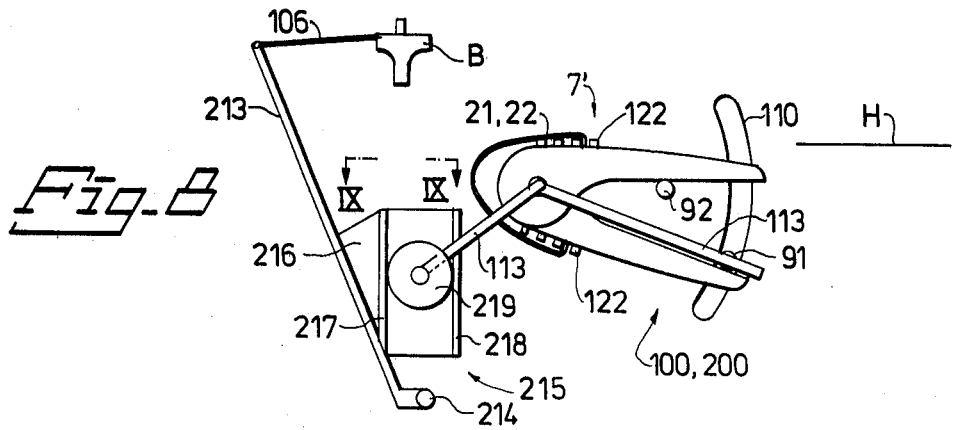
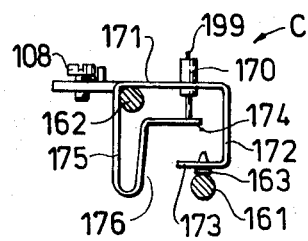
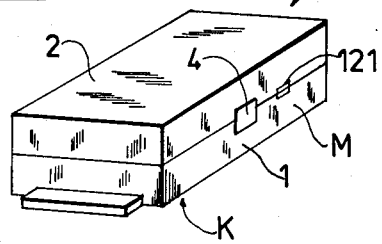
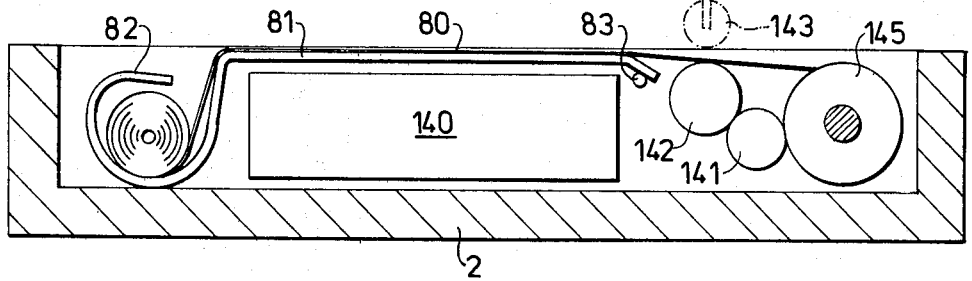

REGISTERING APPARATUS

TECHNICAL FIELD

This invention relates to an apparatus for registering accelerations and retardations, comprising a basic structure on which an inertial mass is suspended in a spring means and adapted for controlling a writing means coacting with a web of registering medium, which is adapted for running substantially transverse the direction of movement of the writing means.

BACKGROUND ART

Known apparatuses for registering accelerations and retardations are burdened with disadvantages, e.g. in the form of a single narrow measuring range, labile neutral position indication, ineffective dampening, especially dampening in the neutral position, while they also lack attitude registering facilities, and have a registering medium feed varying with ambient temperature and/or have registration which is sensitive to temperature.

Registering apparatuses of the type mentioned are customarily utilized for investigating the forces to which goods are subjected during transport. From experience, such forces can be divided into two categories, namely vibrations and shocks. Vibrations of particular interest are those occurring in such situations where goods are transported by a lorry or truck, the vibrations then constituting an indication of the truck springing and road smoothness, and normally have an amplitude of at most about 2 g. Shocks are usually associated with goods handling and can have an amplitude of up to 100 g. Goods are usually packed in such a way that they can withstand minor shocks of up to 10 g, at least when the packed goods have a given prescribed orientation relative to the substructure. Although packing can protect goods against shocks of a given relatively large amplitude, it is not at all certain that the goods will withstand vibrations of relatively low amplitude for a relatively long time, at least in some attitudes.

Apparatuses of the kind in question is normally attached directly to the goods which is to be transported, and should therefore have relatively small physical dimensions these dimensions determining the space for the components in the apparatus. If it is desired to utilize motors, e.g. electric motors, for driving the registering medium, usually a paper web, a problem arises with the batteries of accumulators used for the motor drive, since they have a characteristic which is heavily dependent on temperature. Another disadvantage in connection with registration of measured values is with regard to the type of writing means which is used. For example, if the writing means comprises a stylus which scores a track in a plastic mass on the registering medium, there is always the risk that the stiffness of the mass varies with temperature so that the sensitivity of the apparatus will vary with temperature. This also applies to the cases where the tip of the writing means runs over a pressure-sensitive registering medium which is also sensitive to temperature with respect to effective indication.

OBJECT

One object of the invention is to provide a registering apparatus reducing or eliminating at least some of the above-mentioned disadvantages with known apparatuses of the type in question.

SUMMARY OF INVENTION

The inventive apparatus includes a basic structure on which an inertial mass is suspended in a spring means, and adapted to control a writing means coacting with a web of registering medium which is adapted for running substantially transverse the direction of movement of the writing means, and is essentially distinguished in that the spring means includes two spring elements, of which the first is adapted to bias the mass towards a normal position with a force attaining a fraction of the force with which the mass maximally acts on the first spring element under the action of gravity, and of which the second spring element is adapted for beginning to exercise an elastic deformation resistance to the displacement of the mass when it is moved past a position of displacement situated at a distance from the normal position substantially corresponding to the length the mass maximally can deform the first element under the action of gravity minus a length corresponding to the deformation of the first spring element, occurring at a loading thereof with a force of the same order of magnitude as said biasing force.

With an apparatus in accordance with the invention there is thus afforded two sequential measuring ranges which allow registration of all interesting forces, simultaneously as an indication is obtained as to the attitude of the apparatus, and stable rest positions are afforded for the mass both in the attitude defined by the normal position and in the attitudes displaced by 90° with respect thereto.

Said distance defines the amplitude of the writing means within the first measuring range extending up to 0.9 g, for example. If the mass is moved past said position of displacement, the second spring element comes into action also. The second element can then be selected such that a movement of the mass past said position a length corresponding to said distance corresponds to an acceleration of say 25 g. There is thus obtained a useful registration of both small and large forces acting on the apparatus. By the inventive embodiment of the apparatus, effective neutral position damping is obtained for the mass, irrespective of whether it is in a normal position or in an attitude which is 90° from the normal position. This damping can be traced to the biassing force towards the normal position or to the idling force against the second spring element in the rest positions which are 90° phase shifted. The resonance effects which could occur in the apparatus are inhibited by said normal and rest or idling position dampings.

To advantage, the apparatus can be made such that the mass has the form of a pendulum pivotably mounted on a shaft and having a dog pin, there being a first fork comprising two separate first shanks pivotably mounted on the shaft astride the dog pin and a guiding pin, which is rigidly attached to the base structure in a position corresponding to the neutral position of the pendulum. The first spring element may then be coupled between the first shanks to limit their swinging apart. A second fork comprising two second shanks pivotably mounted on the shaft can further be arranged astride the dog pin and guiding pin, stopping means being arranged to limit the angle contained between the second shanks to a value corresponding to said distance. The second spring element is suitably connected between the second shanks to limit their turning apart.

The biasing force suitably attains about 10% of the force with which the mass maximally can act on the spring means under the action of gravity. The edges facing towards each other of the first shanks are suitably adapted for being in contact with both dog pin and the centre pin in the neutral position of the pendulum, the dog pin being mounted to advantage at the centre of gravity of the pendulum and parallel to the shaft.

The second spring element is suitably formed and adapted so that it affords substantially greater resistance to the movement of the mass than the first spring element. For a deformation corresponding to said distance, the second spring element can thus be arranged to afford a resistance force which is easily selectable and, for example, 25 times as great as the resistance force afforded by the first spring element.

The writing means suitably includes a carriage which is guided for movement transverse the direction of movement of the web and which carries a stylus, consisting to advantage of graphite and which is adapted for being in contact with the web, at least in the operative condition of the apparatus, an arm carried by the dog pin being connected to the carriage, possibly via link means. The web can consist of paper when the stylus consists of graphite or the like.

To advantage, the pendulum is mounted in ball bearings on the shaft. Two diametrically opposing surfaces of the pendulum are suitably made as circular arcs with their centre at the shaft, corresponding complementary abutment surfaces being arranged in the basic structure in conjunction with said pendulum surfaces, the clearance between the pendulum and the base structure at these arcuate surfaces suitably attaining the maximum permitted radial play of the roller bearings. Stop means may be arranged on either side of the pendulum to limit its oscillating movement to an amplitude corresponding to the maximum amplitude of the writing means.

The registering means defined so far has solely been stated to include one inertial mass, but it should be quite clear that the apparatus can to advantage include a second and a third inertial mass, which are substantially arranged to be made and suspended similar to the first-mentioned inertial mass, and connected to associated writing means in an analogical mode, each of the inertial masses being adapted movable in one of three dimensions at right angles to each other. Driving means for the registering medium comprises to advantage of a clock-controlled motor spring, friction compensating means suitably being adapted for compensating for the diameter increase of the roll onto which the web is wound.

The registering means is suitably made as a cassette consisting of two open boxes which are connected to each other by hinges. The inertial mass, as well as its associated spring means and suspending means, as well as the writing means are arranged in one box. The registering medium is arranged in the other box as well as possible driving means for the medium. The writing means can comprise a tubular holder extending in the direction of a normal to the parting plane of the cassette. The holder is adapted for guiding a graphite stylus with a diameter of 0.2 mm, for example. A spring means is arranged under the holder to carry and bias the graphite stylus against the medium in the closed condition of the apparatus. By such a cassette embodiment of the apparatus, there is afforded very simply exchange of registering medium, and graphite can be easily used as stylus. It has namely been found that graphite styluses are excellent material, its ability to write on, and its friction against recording paper also being independent of low ambient temperatures.

The invention will now be described in detail in the following in the form of an example while referring to the appended drawing.

DRAWING

FIG. 1 schematically illustrates an apparatus in accordance with the invention.

FIG. 2 is a view taken along the line II—II in FIG. 1.

FIG. 3 is a view taken along the line III—III in FIG. 2.

FIG. 4 is a view taken along the line IV—IV in FIG. 3.

FIG. 5 is a view taken along the line V—V in FIG. 2.

Figure 1:
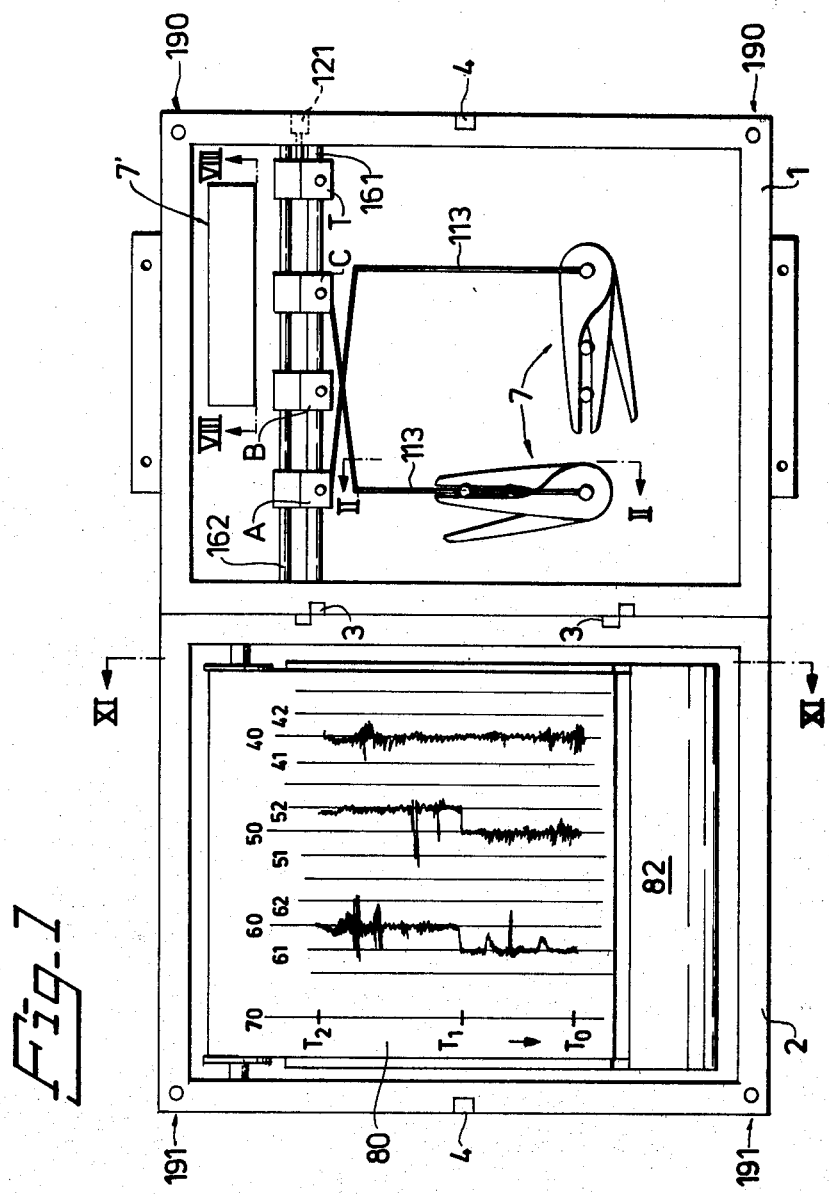

FIG. 8 schematically illustrates a view taken along the line VIII—VIII in FIG. 1.

Figure 9:
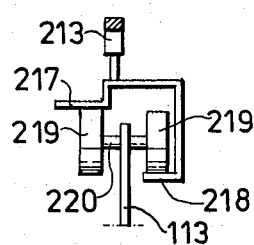

FIG. 9 schematically illustrates a view taken along the line IX—IX in FIG. 8.

FIG. 10 is a side view of a writing means incorporated in the apparatus in accordance with the invention.

FIG. 11 is a view taken along the line XI—XI in FIG. 1.

FIG. 12 schematically illustrates an apparatus in accordance with the invention in an operative condition.

EMBODIMENT EXAMPLE

Two alike boxes 1,2 are illustrated in FIG. 1, and they are connected to each other by means of hinges 3, for easily being put together and locked by means of the lock 4, to define a closed space in which the components of the apparatus can be protectively placed.

The box 1 contains three acceleration and retardation sensing means 7, each of which is adapted for sensing in one of three dimensions mutually at right angles. The means 7 are connected to writing means A,B and C, respectively, which are guided for displacement along rails 161 and 162.

A paper web 80 is arranged to run from a supply 82 to a winding-up roller 155 in the box 2 under the action of a clock-controlled driving mechanism 140,141,142 (see FIG. 11). The web 80 is driven substantially at right angles to the rails 161, 162.

The inertia-sensing means 7 can have substantially similar embodiment and are illustrated in FIGS. 2-6. From FIG. 2 it will be seen that a sensing means 7 includes a pendulum 31 mounted on a shaft 90. The shaft 90 is journalled by means of ball bearings 81 in the box 1. The pendulum 31 also carries a dog pin 91, which is preferably arranged at the centre of gravity of the pendulum 31 and parallel to the shaft 90. An arm 103 is carried on the shaft 90 and pin 91. A first fork 100 and a second fork 200 are pivotably mounted on the shaft 90, e.g. by ball bearings not shown. The first fork 100, which is more closely illustrated in FIG. 3, comprises two separate shanks 101,102 pivotably mounted on the shaft 90. The fork 100 sits astride the dog pin and a guide pin 92, the latter being rigidly mounted in the box 1, in a position corresponding to the normal position of the pendulum 31. A first spring element 21 is coupled between the shanks 101,102 of the first fork, to limit their swinging apart. The spring 21 can have a wishbone shape with inwarly bent ends arranged to engage in recesses 121 on the outside of the respective shank 101,102. The idling moment thus exercised by the spring 21 on the shanks 101,102 can then be set simply. From FIG. 3 it is apparent how the arm 103 connects to an arm portion 113 made rigidly fixed thereto. At its free end the arm portion 113 is connected to a link 106, to which there is attached a writing means C. The link 106 is to advantage made from thin piano wire. The end connecting the arm 113 to the link 106 can be made with an L profile, the upwardly directed link in FIG. 2 of this profile can have a slit 104, while the other leg can have a hole 105, as will be best seen from FIG. 4. In order to afford a simple and accurate turnable connection between the arm 113 and piane wire 106, the end of the wire 106 can be bent round 270° as illustrated at 107 in FIG. 4. The end portion of the wire can then be simply pushed down into the hole 105 and the straight main portion of the wire 106 can be eased into the slit 104. It should be emphasized here that by this means a right angle between the straight portions of the wire 106 can be accurately obtained without any junction radii, as would be the case with a simple bend of the wire end. In this connection it is especially pointed out that the end portion of the wire 106, which is to be inserted in the hole 105, must have very small length if deflection phenomena are to be avoided. Similarly, the wire 106 should have very small diameter to enable bending it in the area between the writing means C and arm 113.

The stroke of the writing means within the first measuring range defined by the spring 21 will be the same, irrespective of whether the pendulum is in its normal position ($S_0$) or in one of the two attitudes ($S_1$; $-S_1$) displaced 90 thereto.

If the apparatus should have an attitude such that the pendulum rests with a force $\Delta F$ against the combined action of the springs 21,22 and is thereby subjected to the action of a force corresponding to a heavy acceleration or retardation, this would become apparent by the writing means being moved past the position $S_1$. The combined spring constant, as determined by the springs 21,22 and their leverage relationships, then provides a translation factor between the movement of the writing means past $S_1$ and the acceleration or retardation force acting on the pendulum. Damping is provided for breaking down possible resonances in the apparatus, when the mass is displaced past the normal position $S_0$ and the position $S_1$.

If so desired, the spring 22 can already be allowed to exercise displacement resistance at a load corresponding to S-$\Delta F$ (0.9 mg). In this way the two measuring ranges $S_0$–$S_1$; $S_1$–$S_2$ will directly tie up with each other. It should be quite clear however, that the spring 22 can be adapted to begin action first at a force application corresponding to $S_1$ (1.0 g). In the first-mentioned case, the combined spring constant of the springs 21,22 is so much higher than the spring constant of the spring 21 that the force increment between 0.9 g and 1.0 g does not cause any appreciable displacement of the writing means past the position $S_1$.

As will be seen from FIG. 1, two means 7 can be arranged in a common plane, but oriented in directions at right angles to each other. There is thus obtained registration of force application in two dimensions mutually at right angles. The means 7 can be substantially identical, only the positions of the force transfer arms 113 being different.

The third means 7', for registering the application of force in a direction normal to the bottom of the box 1, is shown in FIG. 8, where it will be seen that the sensing means 7' conforms in all essentials to the means 7 illustrated in FIGS. 2–6, although there is a translation mechanism 213–220 arranged for translating the oscillating movment of the pendulum to a displacement movement of the writing means B on the rails 161,162. The translating mechanism includes a shaft 220 on the arm 113. The shaft 220 carries two ball bearings 219. One ball bearing 219 runs on a track 217. The other ball bearing 219 runs on a truck 218. The tracks 217,218 are mounted on a bracket 216 attached to an arm 213 which is mounted at 214. The free end of the arm 213 can be made similar to the end of the arm 113 shown in FIG. 2, the connection between the writing means B and the arm 213 being adapted similar to what can be seen from FIGS. 3 and 4.

By the embodiment apparent from FIG. 9 there is provided a "no-play" translation of the movement of the arm 113 to the wire 106.

FIG. 10 illustrates how the writing means C, for example, can be made. The writing means A and B are made analogically. The means C includes a clamping screw 108 for fastening the end of the wire 106. The writing means also includes a leg 171 carrying a narrow tube 170. A leg 172 joins the leg 171, and a leg 173 joins the leg 172 at right angles. A cushion 163, e.g. of Teflon ® is arranged on the leg 173. The cushion is intended to rest against the rail 161. A leg 175 extends at right angles from the leg 171. The corner area between legs 171 and 175 is adapted for guidance by the rail 162. At its lower end, the leg 175 is bent 180° and joins onto a leg 176, joining onto which at 90° there is a leg 174.

The legs 171,172,173 constitute support for carrying the tube 170 in the desired direction. The legs 175,176, 174 constitute a spring means adapted for actuating a pencil lead 199 which is guided by the tube 170. The legs 175, 176,174 are arranged and made such that the point of support of the lead 199 on the leg 174 only moves in the direction of the lead 199. This is most simply provided by allowing the junction between the legs 171,175 to be relatively stiff, allowing the leg 175 to be downwardly tapering to enable bending out to the left in FIG. 10, and allowing the legs 176 and 174 to be bent down relatively to the leg 175.

In accordance with the invention, the use of graphite or soft pencil lead for the stylus 199 is preferred. In order to provide a reasonable resolution of the registration, the stylus 199 should have a diameter in the order of magnitude of 0.2 mm. With the arrangement according to FIG. 9 there is provided automatic feed of the stylus 199 through the tube 170 without the risk of breaking the lead.

The stylus coacts with a registering paper 80 (see FIGS. 1 and 11). The paper 80 runs over a flat plate 81, one end area of which is formed as a store 82 for the paper web. The web is attached to a winding-up roller 145 which is in frictional contact with a driving roller 141. The driving roller 141 drives a roller 142 in contact with the paper web 80. As indicated in FIG. 11, a tensioning roller 143 can be mounted in the box 1 via a spring 144 such that the roller 143 presses the paper web 80 against the roller 142 when boxes 1,2 are swung together. The driving roller 141 is driven by a clock-controlled mechanism 140, preferably a spring driven mechanism. At its right hand end in FIG. 11 the plate 80 is pivotably mounted on a shaft 83 so that the plate 80 and the store 82 can be swung upwards to make the mechanism 140 accessible, which can thus be simply wound up.

As will be seen from FIG. 11, registering paper can be very simply placed in the apparatus without hindrance from writing means. It should be noticed that the writing means A,B,C first come into contact with the registering paper 80 when the boxes are swung together. This also signifies that new styluses 199 can be easily placed in the writing means.

It should also be noted that a further writing means T can be arranged in the box 1 on the rails 161,162. The means T can be made substantially similar to the means A–C, although the means T is suitably spring-biased in a normal position, there being a device 121 (see FIG. 1), e.g. in the form of an opening through the wall of the box 1 to allow the possibility of displacing the means T sideways along the rails 161,162 so that a mark is obtained on the paper 80 when such action is taken. Such marks then constitute a notation of the time at which the means T is actuated, and can be utilized as reference times in connection with assessment of the registrations obtained on the web 80 by the writing means A–C.

Turning now to FIG. 1, means 190,191 are generally indicated therein, these means being adapted to prevent opening the apparatus according to FIG. 1 other than when the bottom of the box 1 is on a horizontal substructure. It is thus avoided that the styluses 199 fall out of their holders when the cassette is opened.

In the box 2 in FIG. 1 there will be seen registrations applied on the paper 80. Printed lines 40,41,42; 50, 51,52; 60,61,62;70 are shown on the paper 80. These lines constitute references with respect to the accelerations and retardations to which the cassette is subjected. The indication $P_0$ may be assumed to be a reference time marking made by the means 121. The writing means A,B,C have thereby registered the application of force in the respective dimension, starting from a normal position which indicates the attitude of the apparatus.

As will be seen, e.g. from FIG. 3, the wire 106 can be attached to the writing means C by means of a simple clamping screw 108.

A second fork 200 is also pivotably mounted on the shaft 90. The second fork 200 includes two separate second shanks 201,202 pivotably mounted on the shaft 90, these shanks being astride the dog pin 91 and guiding pin 92. A flap 203 is arranged on the shank 202. The flap 203 functions as a stop means and prevents the shank 201 from being swung relatively closer to the shank 202. A second spring element 22 is coupled between the shanks 201,202 of the second fork 200. The spring 22 is wishbone-shaped and has inwardly bent end portions, which can be optionally inserted in one of a row of recesses 122 on each of the shanks 201,202. It is thus possible to adjust the turning moment which the spring 22 is to apply to the shanks 201, 202.

Figure 6:
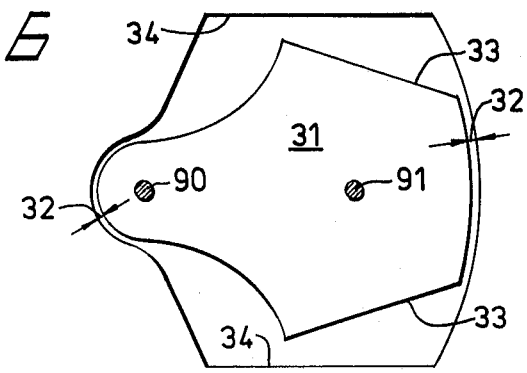
FIG. 6 is a view taken along the line VI—VI in FIG. 2.

FIG. 6 illustrates the embodiment and arrangement of the pendulum 31. The pendulum is accommodated in a space which is laterally defined by walls 34. The pendulum has side surfaces 33 adapted for coming into superficial contact with the walls 34. The walls 34 thus serve to limit the oscillating movement of the pendulum. The pendulum 31 is longitudinally defined by circular arcs with their centre at the shaft 90. The space is longitudinally defined by wall surfaces with a form corresponding to the contiguous defining surfaces of the pendulum. A clearance 32 is thereby arranged between the pendulum and the space in the longitudinal direction of the space. The clearance 32 is arranged to attain at most the maximum permitted radial play of the bearings 81.

Figure 7:
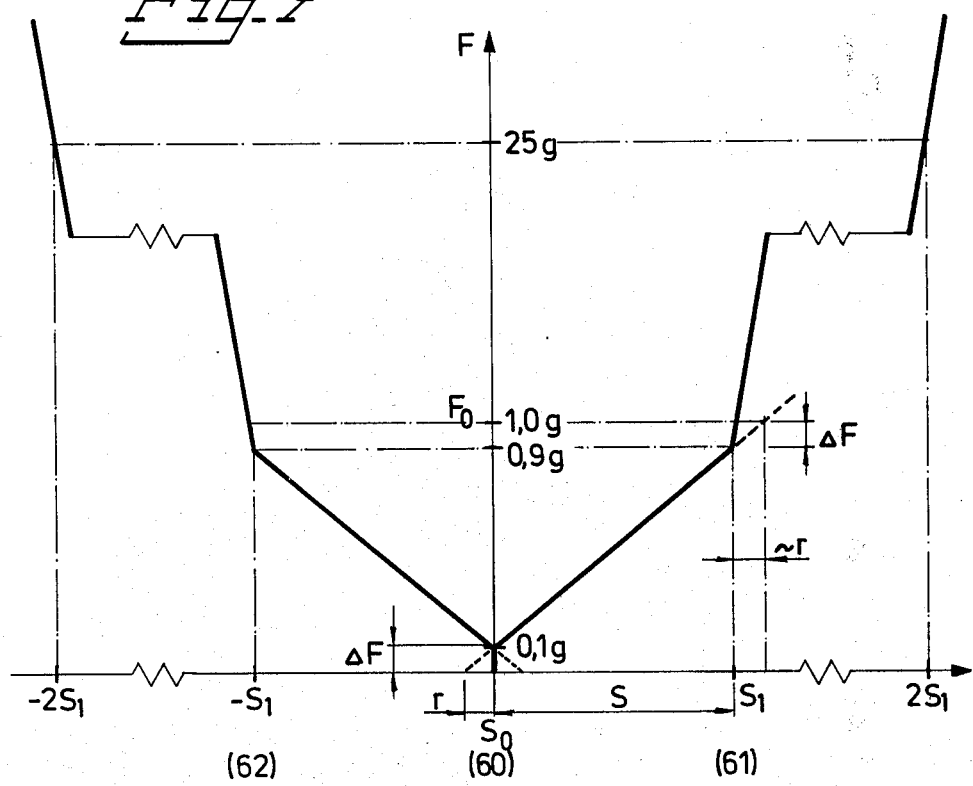
FIG. 7 illustrates the combined spring constant for the spring means incorporated in the apparatus in accordance with the invention.

FIG. 7 schematically illustrates how the writing means are moved under the action of the means 7. It can be assumed that the pendulum 31 has a mass m and that the dog pin 91 is arranged at the centre of gravity of the pendulum. It can be further assumed that the springs 21,22 act in the path of the pendulum's centre of gravity. It can be further assumed that the oscillating angles of the pendulum are very small, so that the centre of gravity of the pendulum moves substantially linearly.

In accordance with the invention, it is prescribed that the first spring element 21 shall afford biassing the pendulum 31 towards its normal position. The bias $\Delta F$ suitably attains a value corresponding to 0.1 g where g relates to gravity. The spring constant of the spring 21 is adapted such that the writing means is displaced a distance $S_1$ when the spring is subjected to a load of the order of magnitude $F-\Delta F$ (e.g. 0.9 g). When the writing means is displaced to the position $S_1$, the dog pin 91 and stop pin 92 are each in contact with the respective shank 201,202 of the second fork 200. The stop flap 203 ensures that the spring 22 does not exercise any force on the pins 91,92 in this condition.

However, if the pendulum 31 is swung out past a position corresponding to $S_1$, the spring 22 will also counteract such an outwardly swinging movement. The spring 22 can be adapted to provide a resistance force, together with the spring 21, for a displacement position 2 $S_1$ which attains for example 25 g, 100 g or 10 g, depending on the greatest measuring range it is desired to give the apparatus.

If the apparatus should be given an attitude such that gravity exercises a maximum torque on the pendulum 30 about the shaft 90, the associated writing means will assume a position corresponding to $S_1$ 61. The pendulum 31 will now rest against the second spring means 22 with the force which is substantially equal to the biassing force $\Delta F$ (0.1 g). When the apparatus is in this attitude, the writing means will not be displaced before an acceleration force on the device 7 exceeds $\Delta F$ (0.1 g). From FIG. 1 it can be read that the apparatus has had an attitude between the times $T_0$ and $T_1$ (indicated along the line 70) which can be read from the writing means A having had a normal position along the line 40, the means B a normal position along the line 50 and the means C a normal position along the line 61. With reference to FIG. 12, the apparatus should thus have been situated with its surface M oriented in the horizontal plane and facing downwards between the times $T_0$ and $T_1$. Correspondingly, it will be seen that during the times $T_1$ and $T_2$ the apparatus has been oriented with its bottom surface K in the horizontal plane and facing downwards. It will be seen that orientation of the apparatus in space can be unambigously determined by reading the positions of the registrations in relation to the normal, or rest positions for the respective writing means in relation to the corresponding lines on the paper 80.

If so desired, a further actuating means can be arranged through the wall of the box 2, e.g. in the vicinity of the locking element 4, by which the drive 140 of the registering paper 80 can be started or stopped while the apparatus is in a closed condition.

When the apparatus is subjected to relatively rapid movements, the registrations will constitute an indication of the accelerations and retardations to which it has been subjected. For relatively slow actions of forces, the registrations will be an indication of the speed at which the apparatus has been acted on. The graphite stylus 199 in the writing means A,B,C affords friction damping of the indicating system, and this damping is independent of temperature conditions, since the friction of the graphite is substantially independent of temperature.

With reference to FIGS. 8 and 9, it can be noted that the tracks 217 and 218 are arranged prestressed towards each other so that the rollers 219 are in stable contact with respective track. There is thus an easily movable connection between the arms 113 and 213, and this connection is entirely without play.

With reference to FIG. 11, the paper 80 is initially wound up with play round the roller 145. When the paper coil round the roller 145 tends to obtain a peripheral speed exceeding the intended paper feed rate, the web begins to be wound from within into tight contact with the roller 145.

The roller 145 is driven by friction contact with the drive roller 141, which is driven by the clock-controlled motor spring 140. A feed roller 142 is positively driven by the roller 141, e.g. by a gear drive. A tensioning roller 143 presses the web 80 against the drive roller 142. If the diameter increase on the winding roller 145 causes a tensional force in the paper web, this tensional force will be transferred via the roller 141 to the roller 142, thus conserving driving power. At the termination of the reeling operation, slip between rollers 141 and 145 can prevent the web 80 increasing speed.

The apparatus in accordance with the invention is suitably enclosed in stable cassette boxes, e.g. made from Hydronalium ®.

In spite of small physical dimensions, the apparatus in accordance with the invention affords a stable, easily read attitude registration and furthermore clear force registration both for relatively small forces of vibrational character and large forces of shock character.

I claim:

1. Apparatus for registering accelerations and retardations, including a basic structure (1,2) on which an inertial mass (31) is suspended by spring means (21, 22) and adapted for controlling a writing means (C) coacting with a web (80) of registering medium adapted for running substantially transverse the direction of movement of the writing means, characterized in that the spring means (21,22) includes two spring elements, of which the first element (21) is adapted for urging the mass (31) to a normal position (60; $S_0$) with a force ($\Delta F$) attaining a fraction of the force ($F_0$) with which the mass maximally acts on the first spring element (21) under the action of gravity, and that the second spring element (22) is adapted to start excercising an elastic deformation resistance to the displacement of the mass when the latter is moved past a displacement position (61,62), substantially situated at a distance (S) from the normal position (60; $S_0$) corresponding to the length (s+r) the mass can maximally deform the biassed first element (21) under the action of gravity minus a length (r) corresponding to the deformation of the first spring element occurring for a loading on the first element (21) with a force of the same order of magnitude as said biassing force ($\Delta F$).

2. Apparatus as claimed in claim 1, characterized in that the mass (31) has the form of a pendulum pivotably mounted on a shaft (90), said pendulum having a dog pin (91), in that a first fork (100) comprising two separate first shanks (101,102) pivotably mounted on the shaft (90) sits astride the dog pin (91) and a guiding pin (92), which is rigidly attached to the basic structure in a position corresponding to the neutral position of the pendulum, in that the first spring element (21) is coupled between the first shanks (101,102) to limit their swinging apart, in that a second fork (200) comprising two separate second shanks (201,202) pivotably mounted on the shaft (90) is astride the dog pin (91) and guiding pin (92), in that stop means (203) are adapted to limit the angle included between the second shanks (201,202) to a value corresponding to the distance (s), and in that the second spring element (22) is coupled between the second shanks (201,202) to limit their swinging apart.

3. Apparatus as claimed in claim 1 or 2, characterized in that the biassing force ($\Delta F$) attains to about 10% of the force (F) with which the mass maximally acts on the spring means under the action of gravity.

4. Apparatus as claimed in claim 2, characterized in that the edges of the first shanks (101,102) facing towards each other are arranged to be in contact with the dog pin (91) as well as the centre pin (92) in neutral position of the pendulum, and that the dog pin (91) is preferably mounted parallel to the shaft and at the centre of gravity of the pendulum.

5. Apparatus as claimed in claim 1 or 2, characterized in that the writing means (C) includes a carriage (170-176) which is guided transverse the direction of movement of the web and which carries a stylus (199), adapted for being in contact with the web (80), there being an arm (103) coupled to the carriage via link mens (113,106), said arm being pivotably mounted at the shaft (90) and carried by the dog pin (91).

6. Apparatus as claimed in claim 4, characterized in that the pendulum (31) is mounted in roller bearings (81) on the shaft (90) and that abutment surfaces are arranged on opposing sides of the pendulum in its radial direction, with a clearance (32) to the pendulum with at most attains the maximum permitted radial play in the bearings (81).

7. Apparatus as claimed in claim 2, characterized in that the second spring element (22) has a spring constant which is about 25 times as great as that of the first spring element (21).

8. Apparatus as claimed in claim 5, characterized in that the mass is movable in a direction normal to the plan of the web, that the link means includes a link arm (213) which is journalled for pivoting movement parallel to the direction of movement of the writing means and the mass, in that the link arm (213) and arm (113) are joined to each other by means of two coaxial ball bearings which are carried by one of the arms and the link arm, and two parallel running tracks on the other of the arms and link arm, the running tracks being resiliently pretensioned toward each other and wherein each of the ball bearings is arranged for running against one of the tracks.

9. Apparatus as claimed in claim 1, characterized in that the driving means for the registering medium web includes a winding roller, which is in frictional contact with a drive roller driven by a power source, in that the drive roller is in positive rolling contact with a feed roller which is in contact with the registering medium web, and in that a free-running tension roller is arranged to tension the web to friction contact with the drive roller.

10. Apparatus as claimed in claims 1, 2, 4, 7 or 9, characterized in that it also includes a second and a third inertial mass, which are arranged, made, suspended and connected to respective writing measn analogous with the first-mentioned mass (31) and in that the three inertial masses are adapted movable, one in each of three dimensions preferably mutually at right angles.

* * * * *